Aug. 22, 1967    A. J. WYSOCZANSKI ET AL    3,336,794
ULTRASONIC TIRE TESTER
Filed July 30, 1964    5 Sheets-Sheet 1

INVENTORS
ALFRED J. WYSOCZANSKI
HELEN SMOLEN
ATTORNEYS.

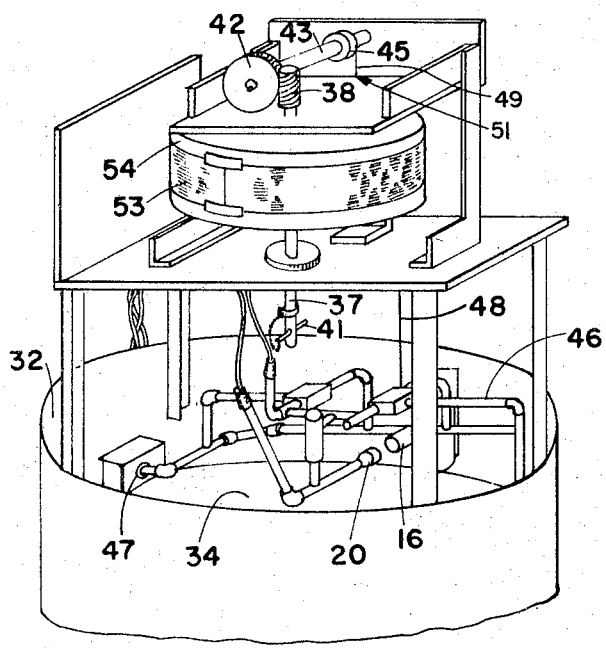
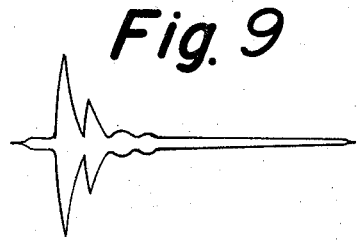
Fig. 9
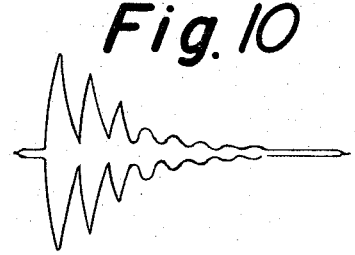
Fig. 10
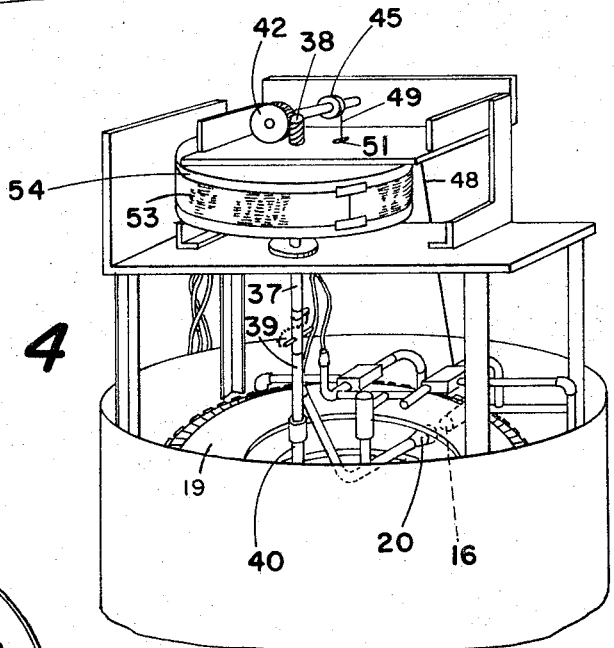
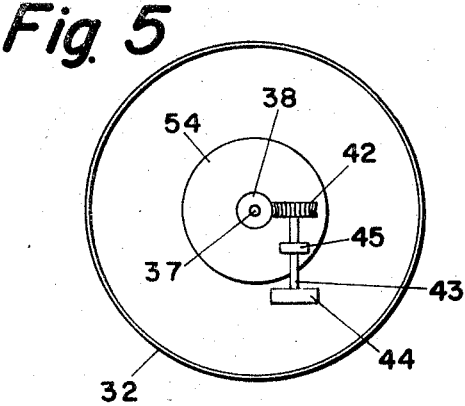

INVENTORS.
ALFRED J. WYSOCZANSKI
HELEN SMOLEN
ATTORNEYS

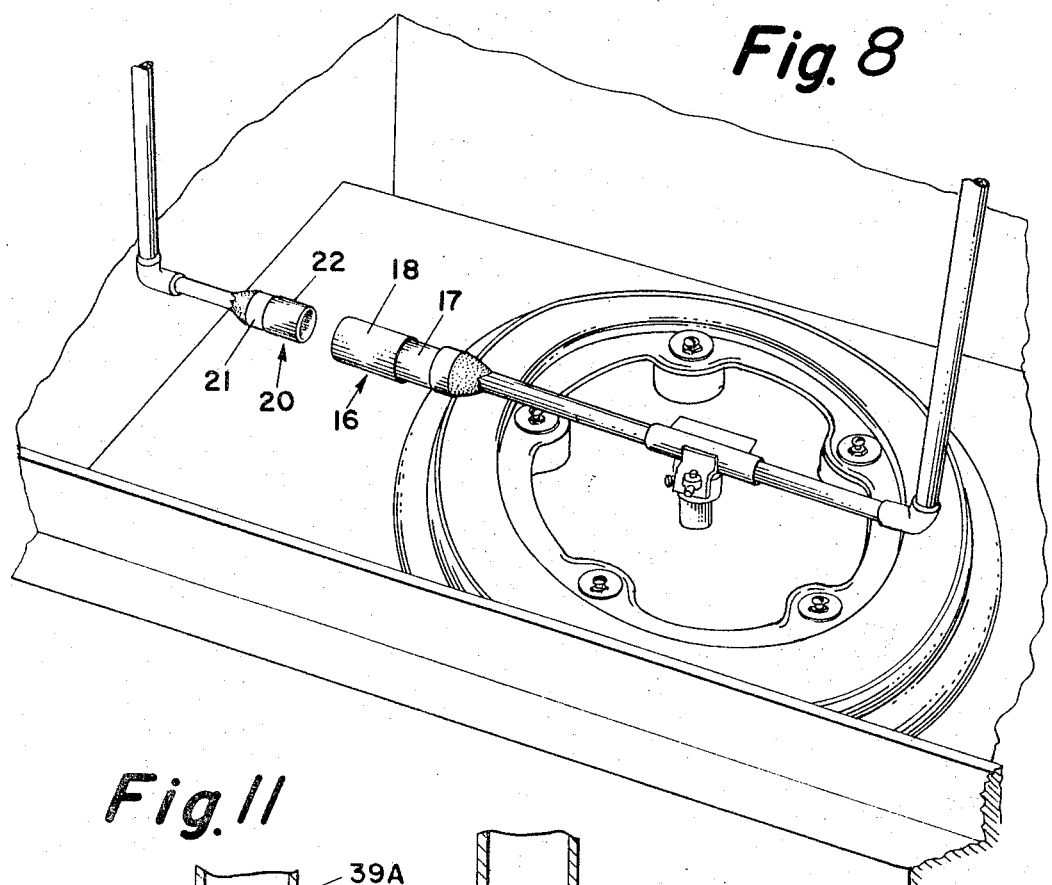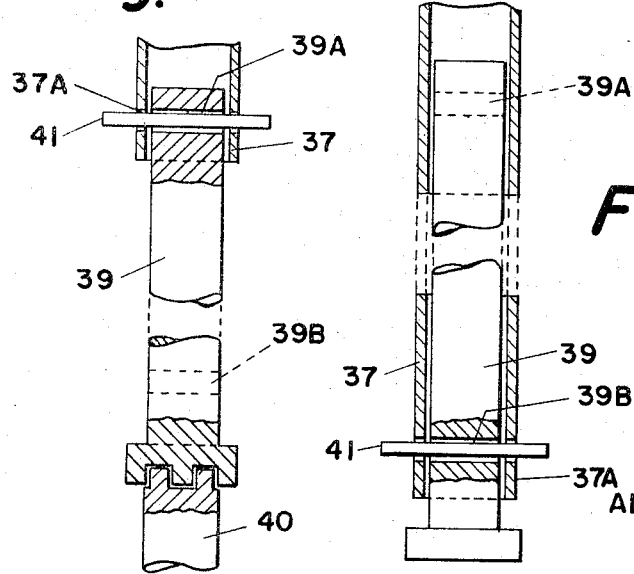

__United States Patent Office__ 3,336,794
Patented Aug. 22, 1967

3,336,794
ULTRASONIC TIRE TESTER
Alfred J. Wysoczanski and Helen Smolen, Philadelphia, Pa., assignors to the United States of America as represented by the Secretary of the Army
Filed July 30, 1964, Ser. No. 386,459
6 Claims. (Cl. 73—67.5)

The invention described herein may be manufactured and used by or for the Government for governmental purposes without the payment to us of any royalty thereon.

This invention relates to the detection of hidden defects in resilient objects such as rubber tires and the like. It has for its primary object to provide an improved apparatus and nondestructive tire testing method of operation whereby very small hidden defects may be evidenced audibly and visually or pictorially.

Heretofore various types of apparatus have been proposed for detecting hidden faults in rubber tires. Among the prior art apparatus types is that disclosed by U.S. Patent 2,378,237. In accordance with this patent, a magnetostrictive oscillator is utilized to transmit mechanical vibrations through the tire under test and these vibrations are picked up by a piezoelectric transducer which converts them to electrical pulses. Through homogeneous structures, the pulses are of a reasonably uniform magnitude. Internal defects in the tire under test are detected by the attenuation of the pulses transmitted through the tire. This apparatus is found to be satisfactory where used tires are tested to determine their suitability for recapping.

Typical flaws in used tires are prone to be comparatively gross or analogous to widely separated laminar type flaws, while the faults in new tires are analogous to very tight-lipped laminations, usually involving incipient ply separation or lack of bond between layers in the tire construction. Thus the apparatus of the aforesaid patent leaves unsolved the problem of detecting the very small flaws likely to occur in unused tires. The present invention solves this by providing an apparatus and method of operation whereby defects measuring 1/4" x 1/4" x .007" are readily detected.

In one embodiment of the invention, an ultrasonic pulse generator energized a 50 kc. "Z" type transducer at 30 kc. The beam of energy produced and projected through the test specimen, is picked up by the receiving transducer and converted into electrical signals. From these are derived audible and visible signals and for quantitative analysis, signal integrating means are provided.

The invention will be better understood from the following description when considered in connection with the accompanying drawings, and its scope is indicated by the appended claims.

Figure 1:
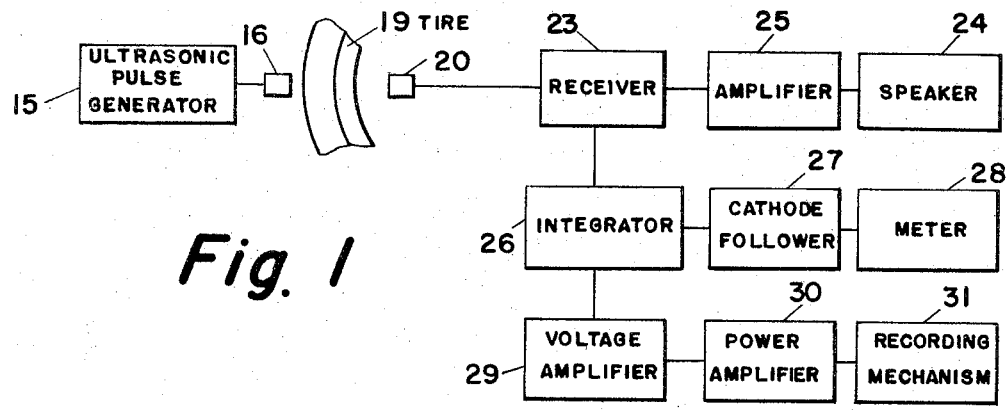
Figure 2:
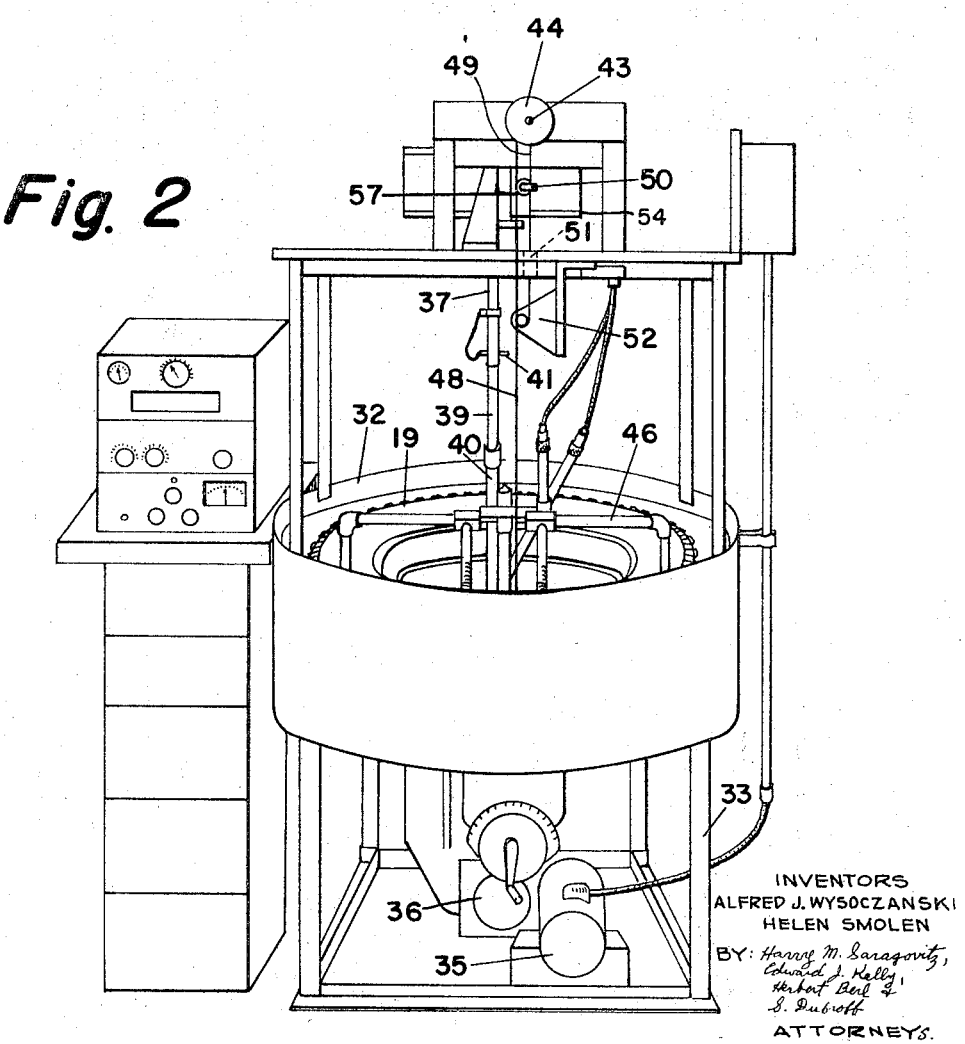

Referring to the drawings:
FIG. 1 is a block diagram illustrating the relation between the various parts of the tire testing system of the present invention, FIG. 2 is a front view in perspective, of a tire scanning mechanism in accordance with the invention, FIG. 3 is a rear view in perspective, of this mechanism showing more clearly than FIG. 2 the mounting of certain transmitter and receiver transducers, FIG. 4 is a similar view as in FIG. 3, illustrating the relation between the transmitter transducer, a tire under test and the receiver transducer.

Figure 6:
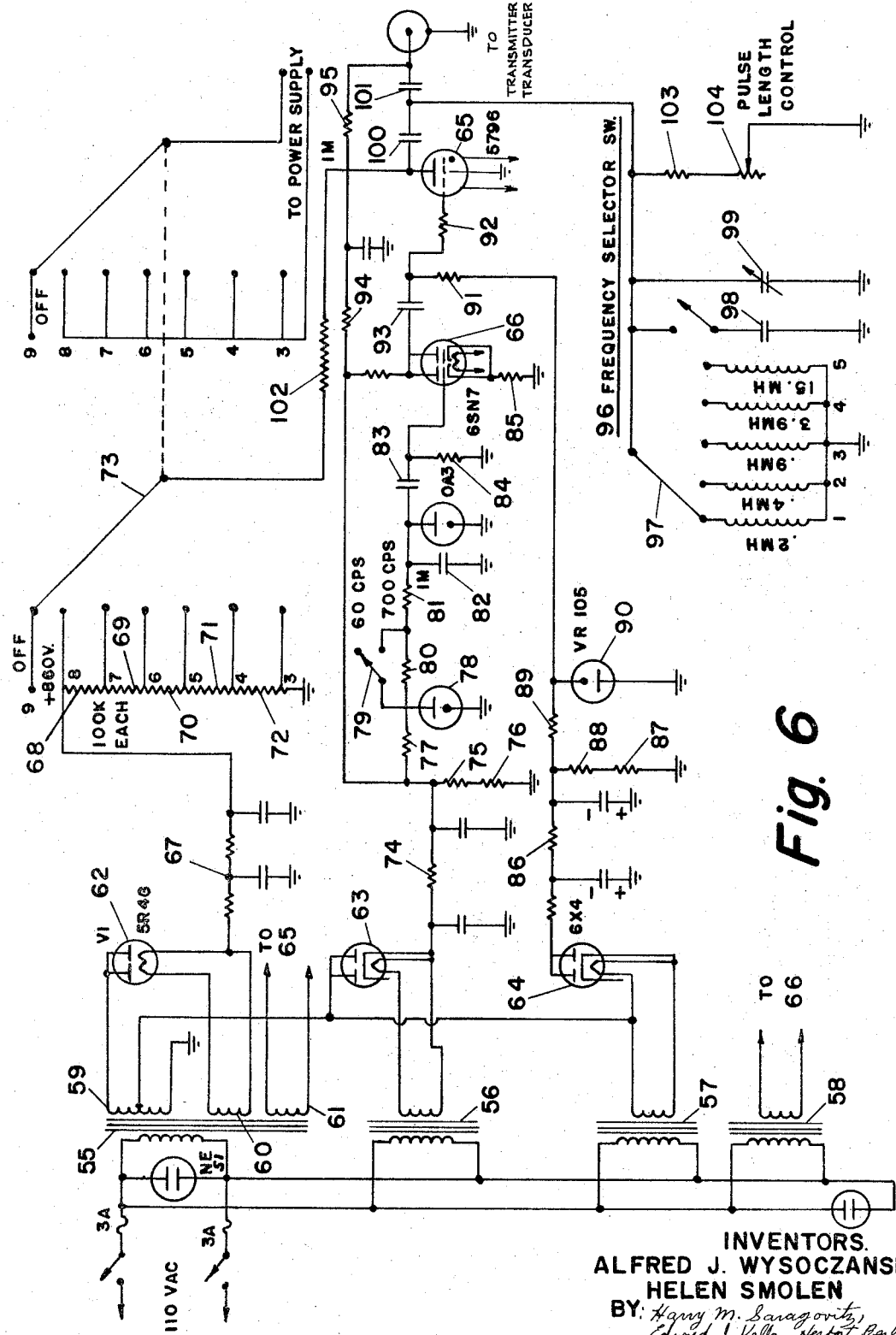
Figure 7:
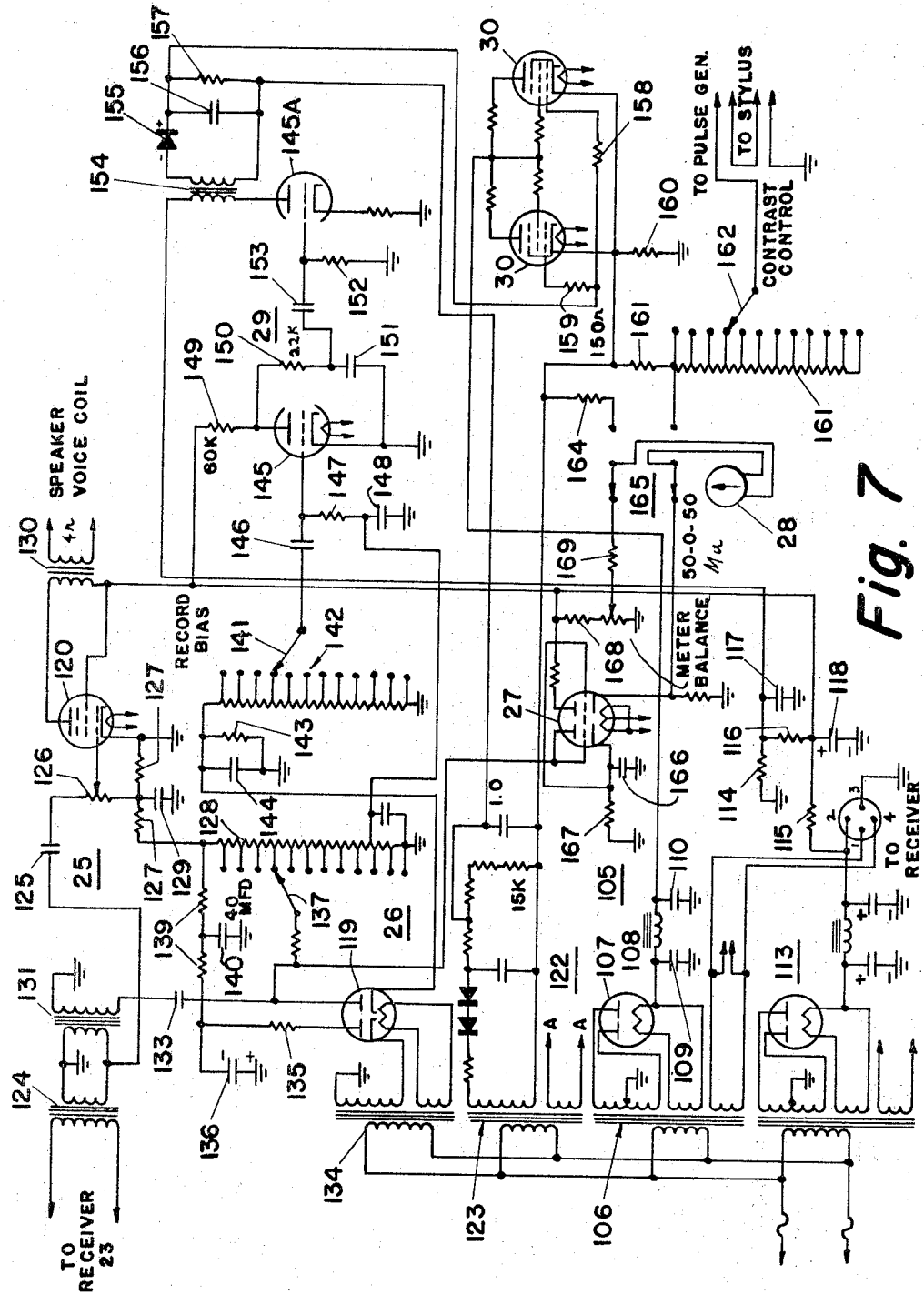

FIG. 5 is a partial top view of the mechanism indicating the relation between a mechanism drive shaft and drums which function to drive a recording stylus and to rotate support means on which the transmitting and receiving transducers are mounted, FIG. 6 is a schematic circuit diagram of an ultrasonic pulse generator which forms a part of the tire testing system, FIG. 7 is a further schematic circuit diagram of a recorder power supply system, FIG. 8 is a partial top view, in perspective, of the transmitter and receiver transducer assemblies with collimating tubes of different lengths fitted over the ends of the transmitter transducer and the receiver transducer, FIG. 9 illustrates the ultrasonic pulses observed on an oscilloscope in the absence of the collimators, FIG. 10 illustrates the ultrasonic pulses observed on an oscilloscope with the collimeters on the transducers as indicated by FIG. 10, and, FIGS. 11 and 12 are fragmentary views, in elevation and partly in section, of shaft elements of the system in two different positions of adjustment.

The nondestructive tire test system illustrated by the block diagram of FIG. 1 includes an ultrasonic generator 15 which energizes a transmitter transducer 16. This transmitter transducer includes a piezoelectric crystal 17 and a collimator 18 (FIG. 8). From the transducer 16, ultrasonic energy is transmitted through a tire or test specimen 19 under test to a receiver transducer 20 which includes a piezoelectric crystal 21 and a collimator 22 (FIG. 8). The piezoelectric crystals 17 and 21 are known commercially as zirconate ("Z" type) transducers. Signal output from the receiver transducer 20 is transmitted to a superheterodyne receiver 23 which may be a National HRO Receiver, for example. As the result of extensive tests, the following combination of these various elements was found to effect the best flaw detection:

(1) "Z" type, 50 kc. transducer, operated at 300 kc., used as the transmitter transducer 16.

(2) "Z" type 400 kc. transducer used as the receiver 20.

(3) National HRO receiver tuned to 300 kc.

(4) Length of collimator 18 three inches and length of collimator 22 one inch.

(5) A 400-volt polarizing voltage across the transmitter transducer 16.

In the operation of the system, the beam of energy developed by the transmitter transducer 16 is projected through the tire 19 and picked up by the receiver transducer 20. Any discontinuity in the path of the beam (such as a ply separation) causes a reduction in the amount of energy passing through the tire 19 to the receiving transducer 20. The received mechanical energy is converted into an electrical signal by the receiver transducer and is amplified by the amplifier 23. A loud speaker 24 connected through an amplifier 25 to the output of the amplifier 23 affords audible detection of the presence of flaws within the tire 19. To allow quantitative analysis of variations in the ultrasonic energy in terms of peak voltage at the receiver output, a signal integrating device or unit 26 is provided. This integrator is connected through a cathode follower 27 to a meter 28 and through a voltage amplifier 29 and a power amplifier 30 to a recorder 31.

The test is made with the tire and the transducers immersed in a liquid coupling medium for effective transmission of the mechanical vibrations between the transducers. The mechanism for accomplishing this result is illustrated by FIGS. 2 to 5.

This mechanism includes a test tank 32 which is mounted on a support or support means 33. Rotatable within the tank 32 is a turntable 34 (FIG. 3) which is driven by a 1/4 horsepower motor 35 (FIG. 2) through a varidrive transmission 36. The varidrive transmission is controllable over a 1 to 10 r.p.m. range. Extending upwardly from, and rotatable with, the turntable 34, is a shaft composed of a lower removable section 40, an intermediate section 39, and an upper hollow section 37 which is fixed to a worm 38. FIGS. 11 and 12 illustrate the manner in which the shaft is positioned to allow the insertion or removal of a tire, and the coupling of the rotatable turntable with the recording drum 54 during execution of a tire test.

The intermediate section 39 is moved into the upper section 37 and locked in this position by a pin 41 through the holes 37A and 39B. At the same time the lower section 40 is removed. With a tire placed on the turntable for test, the shaft is positioned by replacing 40 and fixing the pin 41 through the holes 37A and 39A as shown in FIG. 11.

The worm 38 drives a gear 42 which is fixed to a shaft 43. The shaft 43 has fixed to it a drum 44 through which a tire scanning mechanism is operated and a drum 45 through which the stylus of an electric recorder is actuated.

The tire scanning mechanism includes a framework 46 which is pivoted at two points 47 located directly diametrically opposite each other on the interior of the tank 32. The transmitter transducer 16 and the receiver transducer 20 are fixed to the framework 46 as shown most clearly in FIG. 3. This framework is raised and lowered about the pivots 47 by a flexible metal cable 48 which is wrapped around the drum 44 (FIGS. 2 and 5). As the drum 44 rotates, the transducers 16 and 20 are, in turn, raised and lowered to scan across the tread area of a tire.

The drum 45 actuates a cable 49 to which is fixed a recording stylus 50. As can be understood from FIGS. 2 and 5 the cable 49 passes from the drum 45 through a guideway 51 and over a roller 52 back to the drum 45. As a result, the stylus 50 is moved in accordance with the movement of the scanning transducers 16 and 20. The electric writing stylus 50 cooperates with a band 53 of electric writing paper fixed to a drum 54. The drum 54 rotates with the shaft 37–39–40 which rotates with the turntable 34. Under these conditions, the stylus 50 is synchronized to move vertically with the transducers 16 and 20 and to record helical scanning lines as the tire 19 is rotated. Also, with the transducers, it may be lowered and reset by manually rotating the drum backward while the shaft 40 is disconnected, as between tests.

During this scanning, variations in received ultrasonic energy due to defects or other nonhomogeneous conditions in the tire cause the scan line to be intensity modulated. The presence of large flaws completely interrupts the scan line. If the tire tread is completely scanned, the paper 53 becomes a "picture" showing the location of all flaws, which appear as areas of interrupted scan lines.

In connection with the collimators 18 and 22 of FIG. 8 it is to be understood that the function of these collimators is to increase the transfer of ultrasonic energy through the tire. The extent to which this is accomplished is indicated by FIGS. 9 and 10, FIG. 9 showing an ultrasonic energy pulse as observed on an oscillograph in the absence of the collimators and FIG. 10 showing the same pulse as similarly observed with collimators on the transducers 17 and 21 of FIG. 8.

The connections of the ultrasonic pulse generator 15 are shown in FIG. 6. These connections include four power input transformers 55, 56, 57 and 58. The transformer 55 has three secondary windings 59, 60 and 61. The winding 59 applies 700 volts to the anode circuit of a tube 62, 350 volts to the anode of a tube 63 and 350 volts to the cathode of a tube 64. The secondary winding 60 applies 5 volts across the filament of the tube 62. The winding 61 applies 2.5 volts across the filament of a thyratron tube 65. The transformer 56 applies 6.3 volts across the filament of the tube 63, the transformer 57 applies 6.3 volts across the filament of the tube 64, and the transformer 58 applies 6.3 volts across the filament of a tube 66.

The output of the tube 62, which operates as a half wave rectifier, is filtered by an RC network 67. The output of this network is applied to a voltage dividing network which includes resistors 68 to 72 and constitutes a first section of a pulse attenuator switch 73. This section of the switch 73 permits the voltage applied to the pulse generating thyratron 65 to be varied in steps of 150 volts thereby providing a control over the amplitude of the pulse at the generator output circuit as applied to the input circuit of the transmitter transducer 16 (FIG. 1).

The output of the tube 63, which operates as a half wave rectifier, is filtered by the RC network 74. Associated with this network are resistors 75 and 76 which function to discharge the capacitors of the network 74 after the equipment is shut down. The energy output of the network 74 is reduced to +105 volts by a resistor 77 and a voltage regulator tube 78. An RC circuit formed by a switch 79, two resistors 80 and 81, and a capacitor 82 function in conjunction with the voltage regulator tube OA3 to produce pulses at the rate of 60 or 700 cycles per second, the number of cycles being determined by the position of the switch 79. These pulses are applied through a capacitor 83 and a resistor 84 to the input of the amplifier and phase-reversing tube 66 which has a resistor 85 in its cathode circuit.

The current output of the tube 64, which functions as a half wave rectifier, is filtered by an RC network 86, resistors 87 and 88 serving to discharge the capacitor of this network when the equipment is shut down. Voltage is applied from the output of the network 86 through a resistor 89, and a voltage regulator tube 90, a pair of resistors 91 and 92 to the control grid of the thyratron 65, to maintain the voltage of this grid at −105 volts. This negative voltage prevents the thyration from being fired except by the pulses applied to its grid from the tube 66 through a capacitor 93.

The resistors 94 and 95 form a decoupling and current limiting network and provide the D.C. potential required to polarize the transmitter transducer 16 (FIG. 1).

The coils 96, a frequency selector switch 97, the capacitors 98 and 99, and the properties of the piezoelectric transducer 16 (FIG. 1) determine the frequency of the generated damped wave pulse. The action is as follows: The capacitor 100 is charged to a predetermined potential through the resistor 102 and a part of the resistors 68 to 72 determined by the setting of the pulse attenuator switch 73. The capacitor 100 is also a part of the resonant circuit formed by the coils 96, the capacitors 98 and 99, and the piezoelectric transducer 16 (FIG. 1). When the thyratron 65 is fired by a pulse on its control grid, the capacitor 100 is completely discharged. This causes the resonant circuit to generate a damped wave oscillation. The piezoelectric transducer is connected to the resonant circuit through the capacitor 101 and converts the electrical oscillations into mechanical vibrations. The resistors 103 and 104 control the duration of the damped-wave oscillations by inserting losses into the resonant circuit.

The connections of the recorder elements 50–54 are shown in FIG. 7. These connections include a power supply unit 105 consisting of a transformer 106, a full wave rectifier 107, and a filter inductor 108 and capacitors 109 and 110. This power supply unit 105 provides the D.C. potential required to energize the electric writing recorder system tubes 30—30.

A power supply unit 113 is similar to the power supply unit 105 and provides the power required to operate the tuned amplifier 23 of the receiver transducer 20 (FIG. 1). It also functions through the decoupling network 114 to 118 to (1) apply voltage to anode of the sound level amplifier 25, (2) the meter signal integrating tube 27, and (3) the recorder driver amplifier 29.

A power supply unit 122, consisting of a transformer 123, two selenium rectifiers and associated resistors and capacitors, produces a negative voltage to maintain the no signal plate current in tubes 30—30 at zero.

The output circuit of the receiver transducer amplifier 23 (FIG. 1) is connected to the sound-level amplifier 25 which includes a transformer 124 (FIG. 7). The output winding of the transformer 124 is connected through a capacitor 125 and a sound level control resistor 126 to the sound level amplifier tube 120. Two resistors 127 and a capacitor 129 provide the operating bias for the tube 120. The output circuit of the tube 120 is coupled to the loudspeaker 24 (FIG. 1) through a transformer 130. The function of the tube 120 is to amplify the energy pulses (envelope of the higher-frequency ultrasonic pulses) which are occurring at a frequency equal to the pulse repetition rate (60 or 700 c.p.s.) to a level sufficient to drive the loudspeaker 24.

The transformer 124 is also connected to a transformer 131 which transforms the signal to a higher level and applies it to the integrator 26 and an electrode of a tube 119 therein through a capacitor 133. The tube 119 is a double-diode tube. One half of it functions with the transformer 134, a resistor 135 and a capacitor 136, as a half-wave rectifier power supply means, the negative output potential of which is adjustable by an integration bias selector switch 137 which is operatively associated with ten 820Ω resistors 128, two 10K resistors 139 and a 40 mfd. capacitor 140. The negative voltage derived from this circuit is used to gate the other half of the tube 119 through a resistor to the switch 137.

The level of the gate potential can be adjusted so that signals above a certain level only cause current to flow through the right hand side of the tube 119 and appear as a voltage pulse across the record bias circuit formed by a bias selector switch 141, ten 150K resistors 142, one 390K resistor 143 and one .01 mfd. capacitor 144.

The signal voltage output of the record bias circuit 141–142–143–144 is applied to one section of a duo triode tube 145–145A of the amplifier 29 through a capacitor 146. A resistor 147, a capacitor 148 and a lower section of the integrator bias circuit provide the operating bias voltage for the left-hand section of the tube 145.

The amplified signal pulse appears across the plate load resistor 149 and is integrated further by a resistor 150 and a capacitor 151 which are coupled to the right-hand side of the tube 145A through a resistor 152 and a capacitor 153 for additional amplification. The output circuit of the right-hand side of tube 145A is connected through a transformer 154 to a positive-pulse-forming network including a diode 155, a capacitor 156 and a resistor 157. This pulse-forming circuit is isolated from ground and is connected in series with the negative bias cut-off voltage applied to the tube 30—30 from the power supply unit 122. Since these signal pulses have a positive polarity and are applied to the tube 30—30 through two resistors 158 and 159, these tubes conduct whenever the pulses exceed a predetermined value. When this happens, electric writing is produced by the recorder 31 (FIG. 1). It will be noted that the positive side of the negative bias supply is connected to the cathodes of tubes 30—30. A resistor 160 provides for a maximum resistance of 1250Ω in the cathode circuit of tubes 30—30 when no stylus current is flowing.

A resistor 161 and a contrast-control selector switch 162 form a contrast-controlling circuit. The resistor 161 is composed of ten 150 sections and establishes the minimum resistance in the circuit of the writing stylus 50 (FIG. 2) to 150Ω. The stylus current is measured by measuring the voltage drop across resistor 161 and a resistor 164 by the meter 28. A meter switch 165 permits measuring of the stylus current or the output of the receiver transducer amplifier 23, the measurement being made at the output connection of the right-hand side of the cathode follower tube 27. The left-hand side of the tube 27, together with a capacitor 166 and a resistor 167, form a rectifier-integrator circuit the output of which is fed to the right-hand side of tube 27 which functions as a cathode-follower. The meter is zeroed by adjusting a control resistor 168. A series resistor 169 provides a meter multiplier resistance. The right-hand section of the pulse-attenuator switch 73 (FIG. 6) opens the stylus writing circuit when the pulse generator is in the off position.

For a more detailed consideration of the circuits of FIGS. 6 and 7, the constants of the various elements of these circuits are indicated by appropriate legends.

We claim:

1. A system for detecting hidden faults in a body of rubber or the like, comprising in combination, a vessel containing a coupling liquid, a rotatable turntable for supporting said body in said liquid, a piezoelectric transmitter transducer having a normal vibration period in a range of frequencies including fifty kilocycles per second and located at one side of an operating area of said body, means for applying operating potentials including a relatively high bias potential across said transmitter transducer, means for operating said transmitter transducer to project through said area damped waves in a limited frequency range including three-hundred-and-fifty kilocycles per second, a piezoelectric receiver transducer positioned and adapted to receive said damped waves and having a normal vibration period adjustable to include four-hundred kilocycles per second, thereby to provide an enhanced sensitivity to said defects and a resultant output response from said receiver transducer, means movable upon rotation of said turntable to cause said transducers to move and scan said area for said defects, and means connected with said receiver transducer and adapted to be operated by the signal output in the presence of such defects to indicate nonhomogeneity in said body.

2. In a system for detecting hidden faults in a body of rubber or the like, the combination as defined in claim 1, wherein said transmitter-transducer includes a first collimator element of predetermined length and said receiver-transducer includes a second collimator element of lesser length than said first element.

3. A system for detecting hidden faults in a body of rubber or the like, comprising in combination, a test tank containing a liquid mechanical coupling medium, a rotatable turntable for supporting said body in said coupling medium within the tank, a piezoelectric transmitter transducer located in operative relation and adapted to apply ultrasonic signal energy through said medium to said body, said transducer including a piezoelectric crystal and a collimator element for the transmitted energy therefrom to said body, an ultrasonic pulse generator connected to drive said transducer and the crystal therein for signal transmission therefrom to and through said body, a receiver transducer including a second piezoelectric crystal with a collimator element positioned and adapted to receive and convert ultrasonic signal energy transmitted through said body from the transmitter transducer, means connected with said receiver transducer for deriving sound energy from said converted signal energy, and means for indicating and measuring the amplitude of the said converted signal energy, said last named means including a scanning mechanism comprising a pivoted frame carrying said transducers, a recording stylus connected to move with said transducers, a rotatable recording drum and a chart element carried thereby in operative recording relation to said stylus, and a sectionalized shaft connecting the turntable and said drum to move the latter in synchronism with the turntable, said shaft extending from the turntable centrally thereof and being sectionalized to effect disconnection with the drum and permit loading of the turntable between test operations.

4. A system for detecting hidden faults in a rubber tire or like test body, comprising in combination, a test tank containing a coupling liquid, a rotatable turntable for supporting the said tire or test body in said liquid, a piezoelectric transmitter transducer having a normal vibration period of $x$ kilocycles per second and located in the tank and positioned to stand at one side of the tread or like area of a tire or test body therein, means for applying operating potentials including a bias potential to said transmitter transducer, means for applying to said transmitter transducer a damped wave having a frequency of $6x$ kilocycles per second to provide ultra sonic output energy therefrom, a piezoelectric receiver transducer having a natural vibration period of $8x$ kilocycles per second and located in the tank and positioned to stand at the other side of the said tread or like area and translate received energy from the transmitter-transducer into an output signal, means movable through the shaft of said turntable to cause said transducers to scan said tread or like area, and circuit means including an electric recorder for said output signal connected to said receiver transducer, said recorder being mechanically operable through said shaft to produce a pictorial representation of the said faults in the said tire or like test body in response to the application of said output signal thereto.

5. A system for detecting hidden faults in a rubber tire or like test body as defined in claim 4, wherein said circuit means interconnecting said receiver transducer and said electric recorder further includes a signal amplifier and a signal integrator operative to cut off the output signal to said recorder below a predetermined amplitude level.

6. A system for detecting hidden faults in a rubber tire or like test body as defined in claim 5, wherein the signal amplifier is coupled through a positive pulse forming network with a power amplifier connected for driving a stylus element in said recorder, and wherein the power amplifier is adapted to conduct signals only in response to positive pulses above a predetermined amplitude from said signal amplifier through said pulse forming network.

References Cited

UNITED STATES PATENTS

| | | | |
|---|---|---|---|
| 2,378,237 | 6/1945 | Morris | 73—67.6 |
| 2,461,543 | 2/1949 | Gunn | 73—67.5 X |
| 2,527,208 | 10/1950 | Berry et al. | 73—67.6 |
| 2,921,126 | 1/1960 | Street et al. | 73—67.6 X |
| 3,063,290 | 11/1962 | Kaserman et al. | 73—67.8 |
| 3,169,393 | 2/1965 | Stebbins | 73—67.9 |

FOREIGN PATENTS 701,455   12/1953   England.

OTHER REFERENCES

"Ultrasonics," by Carlin copyrighted by McGraw-Hill, 1960, pages 183–184.

JAMES J. GILL, *Acting Primary Examiner.*